United States Patent
Lin et al.

(10) Patent No.: US 11,307,383 B2
(45) Date of Patent: Apr. 19, 2022

(54) LENS AND FABRICATION METHOD THEREOF

(71) Applicant: Rays Optics Inc., Hsinchu (TW)

(72) Inventors: Ying-Hsiu Lin, Hsinchu (TW); Kuo-Chuan Wang, Hsinchu (TW)

(73) Assignee: Ray Optics Inc., Hsinchu (TW)

( * ) Notice: Subject to any disclaimer, the term of this patent is extended or adjusted under 35 U.S.C. 154(b) by 255 days.

(21) Appl. No.: 16/387,654

(22) Filed: Apr. 18, 2019

(65) Prior Publication Data
US 2020/0192062 A1    Jun. 18, 2020

(30) Foreign Application Priority Data
Dec. 14, 2018    (TW) .................................. 107145160

(51) Int. Cl.
*G02B 9/62*    (2006.01)
*G02B 13/18*    (2006.01)

(52) U.S. Cl.
CPC .............. *G02B 9/62* (2013.01); *G02B 13/18* (2013.01)

(58) Field of Classification Search
CPC ...... G02B 13/06; G02B 13/146; G02B 13/18; G02B 9/62
See application file for complete search history.

(56) References Cited

U.S. PATENT DOCUMENTS

| | | | | |
|---|---|---|---|---|
| 2009/0251801 A1* | 10/2009 | Jung | ................... | G02B 13/006 359/708 |
| 2010/0142062 A1* | 6/2010 | Asami | ................... | G02B 13/04 359/793 |
| 2012/0026285 A1* | 2/2012 | Yoshida | ............. | G02B 13/0045 348/36 |
| 2012/0099203 A1* | 4/2012 | Boubis | ................. | G02B 13/146 359/558 |
| 2014/0198395 A1* | 7/2014 | Ryu | ........................ | G02B 9/60 359/713 |
| 2015/0062720 A1* | 3/2015 | Lai | .......................... | G02B 3/02 359/713 |

* cited by examiner

*Primary Examiner* — Joseph P Martinez
*Assistant Examiner* — Vipin Patel

(57) ABSTRACT

A lens assembly includes a first lens group, a second lens group and an aperture. The first lens group includes two lenses with refractive power. The second lens group with a positive refractive power includes at least two lenses with refractive power. The aperture is disposed between the first lens group and the second lens group. The lens assembly includes 5 to 8 lenses with refractive power. D1 is the diameter of the lens surface of the first lens group farthest from the second lens group. LT is the length on the optical axis of the lens from the lens surface farthest from the imaging plane of the lens assembly to the lens surface closest to the imaging plane of the lens assembly. IMH is the maximum imaging height of lens assembly on the imaging plane, wherein the lens assembly satisfies conditions: $3.5 < LT/IMH < 6$, $0.65 < D1/LT < 0.98$.

20 Claims, 9 Drawing Sheets

LENS AND FABRICATION METHOD THEREOF

This application claims the benefit of Taiwan application Serial No. 107145160, filed Dec. 14, 2018, the subject matter of which is incorporated herein by reference.

BACKGROUND OF THE INVENTION

Field of the Invention

The invention relates in general to a lens and a fabrication method thereof.

Description of the Related Art

With the progress of technology, there are more applications for lenses. The lens used in the home security camera is becoming common. Currently, there is an increasing demand for a thinner size, lighter weight and better image quality of camera. To satisfy the demand, the features of lens needs to be lower cost, larger aperture, wider viewing angle, lighter weight, shorter total track length with IR correction. Therefore, lens which is capable of forming high quality images with IR correction on a minimized total track length, and lower cost has been vigorously conducted.

The description of related art is provided to facilitate the understanding of the present invention. Therefore, the contents disclosed in the related art may include some technologies not generally known to anyone ordinarily skilled in the technology field of the present invention. The contents disclosed in the related art and the problems that one or more than one embodiment of the present invention aims to resolve are not necessarily known to or acknowledged by anyone ordinarily skilled in the technology field of the present invention before the application of the present invention is filed.

SUMMARY OF THE INVENTION

Other objects and advantages of the present invention can be understood from the technical features disclosed in the embodiments of the present invention.

According to one embodiment of the present invention, a lens assembly including a first lens group, a second lens group and an aperture is provided. The first lens group includes at least two lenses with the refractive power. The second lens group with a positive refractive power includes at least two lenses with the refractive power. The aperture is disposed between the first lens group and the second lens group. The number of the lenses with refractive power is larger than 4 but less than 9; D1 is the diameter of the lens surface of the first lens group farthest from the second lens group; LT is the length on the optical axis of the lens from the lens surface farthest from the imaging plane of the lens assembly to the lens surface closest to the imaging plane of the lens assembly; IMH is the maximum imaging height of lens assembly on the imaging plane; the lens assembly satisfies the following conditions: $3.5<LT/IMH<6$, $0.65<D1/LT<0.98$. In the present embodiment, the lens assembly includes 5 to 8 elements, which including multiple aspheric lenses and is divided into two lens groups. Thus, an image lens having the features of lighter weight, shorter total track length, lower cost, and better image quality with IR correction can be achieved.

According to another perspective of the present invention, a lens assembly is provided. The first to the fifth lens are sequentially arranged in the lens assembly from the image magnification side to the image reduction side, wherein the second to the fifth lens are aspheric lenses. The lens assembly includes less than 9 elements with refractive power, and the field of view (FOV) is between 180° and 220°. The intersection of a first focal plane with an optical path of the lens assembly is referred as a first intersection, and the first focal plane is the focal point at wavelength of 555 nm of the lens assembly; the intersection of a second focal plane with an optical path of the lens assembly is referred as a second intersection, and the second focal plane is the focal point at wavelength of 850 nm of the lens assembly; the distance from the second intersection to the first intersection is less than 20 μm. In the present embodiment, the lens assembly which including 5 to 8 elements is composed of multiple spherical lenses and multiple aspheric plastic lenses. Thus, an image lens having the features of lighter weight, shorter total track length, lower cost, and better image quality with IR correction can be achieved.

Through the design disclosed in the embodiments of the present invention, an image lens having the features of excellent image quality with IR correction, and low manufacturing cost is provided. In the lens assembly of the present disclosure, the total track length (TTL) of the lens assembly, which including 5 to 8 elements is less than 15 mm. TTL is the length on the optical axis of the lens from the lens surface farthest from the imaging plane to the imaging plane of the lens assembly. Thus, an image lens having the features of large aperture, lighter weight, shorter total track length, lower cost, and better optical quality with IR correction can be achieved.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 2 and FIG. 3, respectively, are a focus shift plot and a ray fan plot of the lens assembly 10a.

DETAILED DESCRIPTION OF THE INVENTION

The technical contents, features, and effects of the present invention are disclosed below in a number of embodiments with accompanying drawings. Directional terms such as above, under, left, right, front or back are used in the following embodiments to indicate the directions of the accompanying drawings, not for limiting the present invention. Moreover, ordinal numbers, such as "the first" and "the second", are used in the following embodiments to clearly distinguish the elements having the same designations, not for limiting the elements.

The optical elements in the present invention refer to the elements partly or completely formed of reflective or transmissive materials normally composed of glass or plastics. Examples of the optical elements include lens, prism or aperture.

When the lens is used in an image system, the image magnification side refers to the side of the lens assembly close to a target object on the optical path, and the image reduction side refers to the side of the lens assembly close to the light sensing element on the optical path.

The object side (or the image side) of a lens may have a convex portion (or a concave portion) at a particular region. The convex portion (or the concave portion) at a particular region is more protruded outwards (or recessed inwards) in a direction parallel to the direction of the optical path than the outer region surrounding the said particular region in the radial direction.

Figure 1:
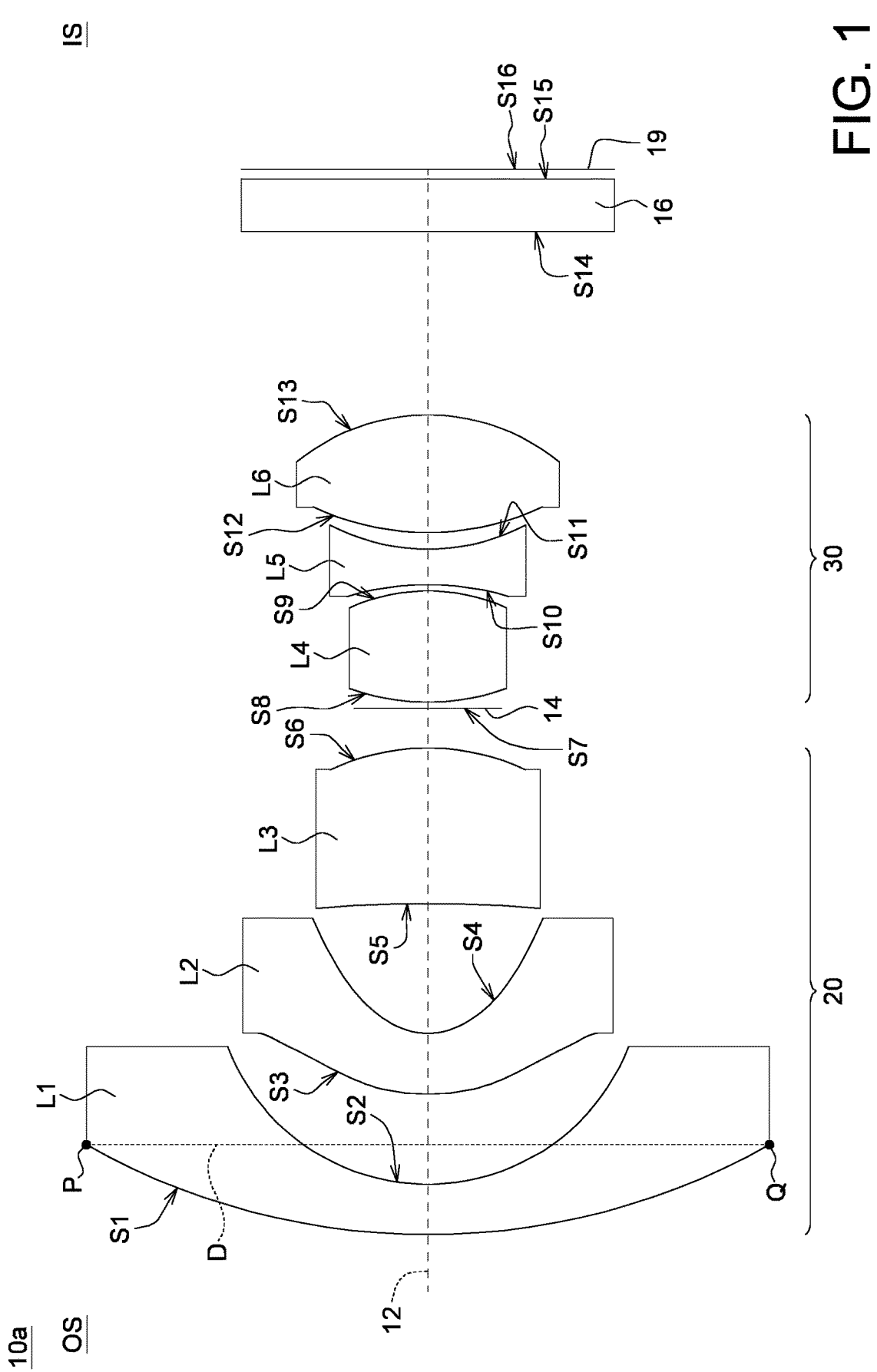
FIG. 1 is a schematic diagram of a lens assembly 10a according to an embodiment of the present invention.

FIG. 1 is a schematic structure view of a lens assembly 10a according to the present disclosure. In the present embodiment, the lens assembly 10a comprises, which including a lens barrel (not illustrated), from the image magnification side (OS) to the image reduction side (IS) in sequence, a first lens L1, a second lens L2, a third lens L3, an aperture 14, a fourth lens L4, a fifth lens L5 and a sixth lens L6.

The first lens unit (such as the front group) 20, with a negative refractive power is constructed with the first lens L1, the second lens L2 and the third lens L3. The second lens unit (such as the rear group) 30, with a positive refractive power is constructed with the fourth lens L4, the fifth lens L5 and the sixth lens L6. Moreover, a cover glass 16 and an image sensor (not illustrated) are disposed on the image reduction side IS. The imaging plane of the lens assembly 10a is designated by 19. The cover glass 16 is disposed between the second lens unit 30 and the imaging plane 19 of the lens assembly 10a.

In the present embodiment, the refractive powers of the first lens L1 to the sixth lens L6, in sequence, are: negative, negative, positive, positive, negative, positive; and the second, the third, the fifth and the sixth lens are aspheric plastic lenses. In an embodiment, the aspheric plastic lenses can be replaced by aspheric glass lenses. Additionally, two lenses, two adjacent surfaces, with substantially identical radius of curvature (the difference between the radius of curvature is less than 0.005 mm) or completely identical radius of curvature can form a combined lens, a cermet lens, a doublet or a triplet. In the present embodiment, the fourth lens L4 can be realized by a doublet or a triplet; such as the lens assembly including eight elements with refractive power of the present embodiment. The present invention is not limited thereto.

In each diagram of each embodiment of the present invention, the image magnification side (OS) is illustrated at the left-hand side; the image reduction side (IS) is illustrated at the right-hand side, and the similarities are not repeated here.

In the present invention, the aperture 14 refers to an aperture stop. The aperture is an independent element or combines with other optical elements. In the present embodiment, the aperture is blocking the light by a mechanism parts. The said mechanism parts can be adjustable, which means the position, shape and transparency of the mechanism parts can be adjusted. Or, the aperture can limit the optical path by coating a light absorbing material on the corner surface of the lens, but keeping the central part of the lens is transparency to the light.

The surface diameter is defined on each lens. As indicated in FIG. 1, the surface diameter (D) of a lens is the distance, in the direction perpendicular to an optical axis 12, between two turning points P and Q at the edges of the lens. In the present embodiment, the diameter of surface S1 is 8.6 mm, and the diameter of surface S13 is 3.3 mm.

The design parameters, shapes and aspheric coefficients of the lens assembly 10a are listed in Table 1 and Table 2. In a design example of the present invention, the aspheric polynomial can be expressed as:

$$Z = \frac{cr^2}{1+\sqrt{1-(1+k)c^2r^2}} + Ar^4 + Br^6 + Cr^8 + Dr^{10} + Er^{12} + Fr^{14} + \ldots \quad (1)$$

In the formula (1), Z represents the sag along the direction of the optical axis; c represents the reciprocal of the radius of curvature of an osculating sphere, that is, the reciprocal of the radius of curvature close to the optical axis; k represents the conic constant; r represents the height of the aspheric surface, that is, the height from the center to the edge of the lens. In Table 2, columns A to G is, respectively, the $4^{th}$, the $6^{th}$, the $8^{th}$, the $10^{th}$, the $12^{th}$, the $14^{th}$, the $16^{th}$, the $18^{th}$, and the $20^{th}$ coefficient of the aspheric polynomial. However, the data exemplified below are not for limiting the present invention. Any person, with common knowledge, can make any modifications or adjustments to the parameters of the present invention, and the said modifications or adjustments are still within the scope of the present invention

TABLE 1

| F/# = 2.0; TTL = 12.2 (mm); LT = 9.39 (mm) | | | | |
| DFOV = 191°; LT/DL = 2.85; IMH = 2.2 (mm) | | | | |
| D1/DL = 2.6; LT/IMH = 4.27; D1/LT = 0.915 | | | | |

| Surface | Radius of curvature (mm) | Distance (mm) | Refractive power | Abbe number | Element |
| --- | --- | --- | --- | --- | --- |
| S1 | 9.39 | 0.57 | 1.83 | 42.7 | L1 (convex-concave) |
| S2 | 2.82 | 1.03 | | | |
| S3* | 3.11 | 0.70 | 1.55 | 56.1 | L2 (aspheric) |
| S4* | 1.10 | 1.47 | | | |
| S5* | −26.82 | 1.81 | 1.66 | 20.4 | L3 (aspheric) |
| S6* | −3.33 | 0.45 | | | |
| S7 | INF. | 0.05 | | | Aperture 14 |
| S8 | 2.94 | 1.30 | 1.46 | 90.2 | L4 (bi-convex) |
| S9 | −2.40 | 0.05 | | | |
| S10* | −12.01 | 0.40 | 1.66 | 20.4 | L5 (aspheric) |
| S11* | 1.78 | 0.21 | | | |
| S12* | 2.43 | 1.35 | 1.55 | 56.1 | L6 (aspheric) |
| S13* | −2.62 | 2.15 | | | |
| S14 | INF. | 0.61 | 1.52 | 64.2 | Cover glass 18 |
| S15 | INF. | 0.05 | | | |
| S16 | | | | | Imaging plane 19 |

TABLE 2

| | S3* | S4* | S5* | S6* |
| --- | --- | --- | --- | --- |
| k | 0.38 | −0.86 | 82.2 | −0.12 |
| A | 3.40E−02 | 1.35E−01 | 6.04E−03 | −1.14E−03 |
| B | −2.21E−02 | −7.39E−02 | −5.07E−03 | −1.21E−03 |
| C | 9.19E−03 | 1.12E−01 | 4.07E−03 | 6.86E−05 |
| D | −4.11E−03 | −1.19E−01 | −2.29E−03 | 9.88E−05 |
| E | 1.17E−03 | 6.59E−02 | 3.19E−04 | −1.23E−05 |
| F | −1.92E−04 | −1.94E−02 | — | — |
| G | 1.69E−05 | 2.40E−03 | — | — |

| | S10* | S11* | S12* | S13* |
| --- | --- | --- | --- | --- |

TABLE 2-continued

| k | 17.87 | −1.17 | −1.30 | −1.19 |
|---|---|---|---|---|
| A | −1.32E−01 | −1.96E−01 | −9.04E−02 | −4.07E−03 |
| B | 1.51E−01 | 2.59E−01 | 6.66E−02 | −7.56E−03 |
| C | −1.77E−01 | −2.72E−01 | −4.26E−02 | 6.71E−03 |
| D | 1.33E−01 | 2.02E−01 | 2.08E−02 | −4.19E−03 |
| E | −5.76E−02 | −9.65E−02 | −6.92E−03 | 1.70E−03 |
| F | 1.08E−02 | 2.64E−02 | 1.41E−03 | −3.85E−04 |
| G | — | −3.11E−03 | −1.30E−04 | 4.08E−05 |

The distance of the surface S1 is the distance on the optical axis 12 from the surface S1 to the surface S2. The distance of the surface S2 is the distance on the optical axis 12 from the surface S2 to the surface S3. The distance of the surface S15 is the distance on the optical axis 12 from the surface S15 to the imaging plane 19 of this lens assembly 10a.

In the tables, the surface with a * sign is an aspheric surface, and the surface without the * sign is a spherical surface.

The radius of curvature refers to the reciprocal of the curvature. When the radius of curvature is positive, the sphere center of the lens surface is located at the image reduction side of the lens assembly. When the radius of curvature is negative, the sphere center of the lens surface is located at the image magnification side of the lens assembly. The concavity and convexity of each lens are listed in above tables.

The aperture value of the present invention is represented by F/# as indicated in above tables. When the lens of the present invention is used in a projection system, the imaging plane is a light valve surface. When the lens is used in an image system, the imaging plane refers to the surface of the light sensing element.

When the lens is used in an image system, the image height IMH is ½ of the length of the image circle on the imaging plane as indicated in above tables.

In the present invention, the total length of the lens assembly is represented by LT as indicated in above tables. To be more specifically, in the present embodiment, the total length refers to the distance on the optical axis 12 of the lens assembly 10a from the optical surface S1, closest to the image magnification side to the optical surface S13, closest to the image reduction side. The total length (LT) of the lens assembly is less than 11 mm. In the present invention, the total track length (TTL) from the lens assembly to the imaging plane 19 is represented by TTL as indicated in above tables. To be more specifically, in the present embodiment, the total track length (TTL) from the lens to the imaging plane 19 refers to the distance on the optical axis 12 of the lens assembly 10a from the optical surface S1, closest to the image magnification side to the imaging plane 19 of the lens assembly.

In the present embodiment, diagonal field of view (DFOV) refers to the receiving angle of the optical surface S1, closest to the image magnification end, that is, the measured maximum field of view as indicated in above tables.

Figure 2:
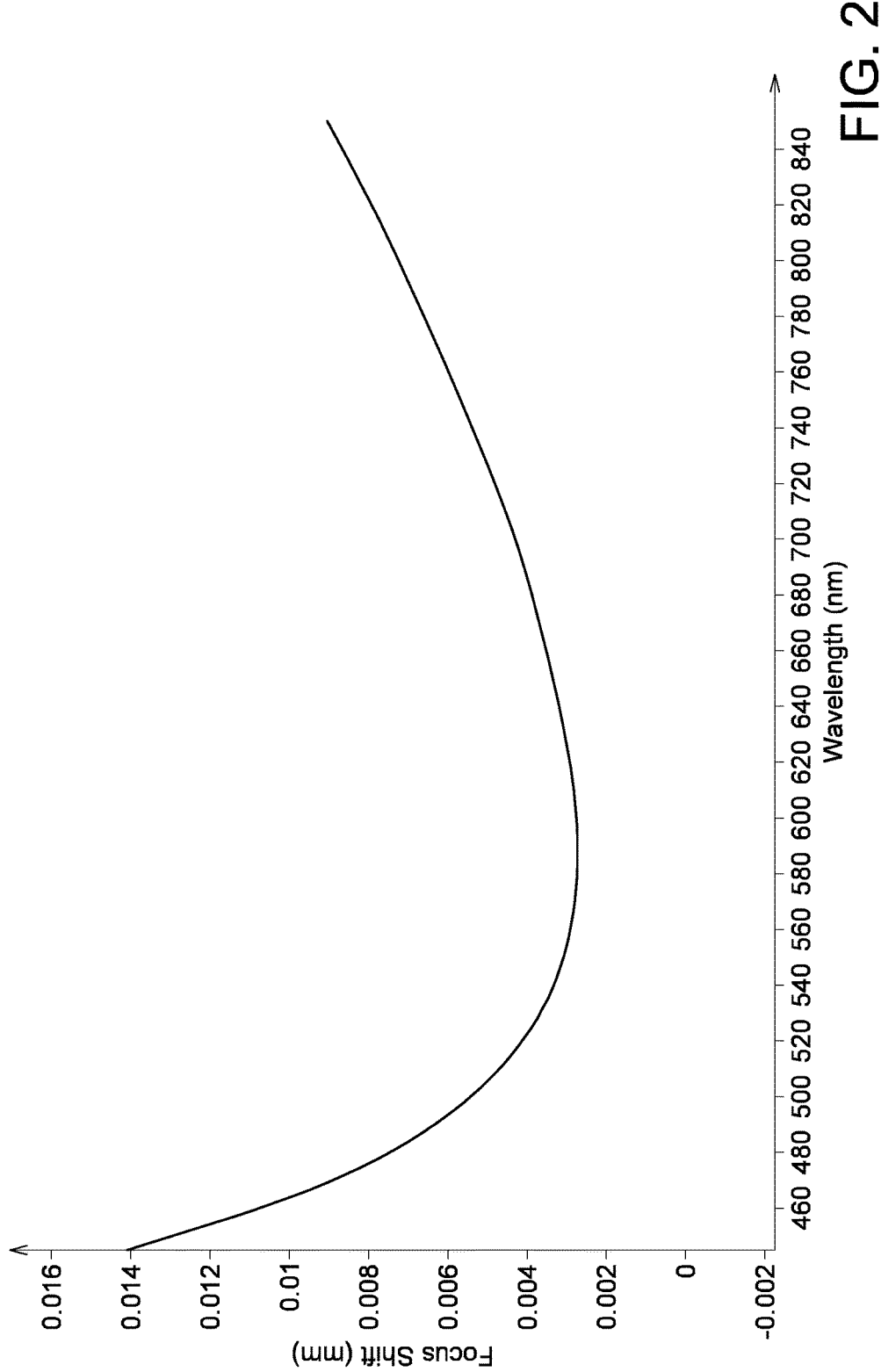
Figure 3:
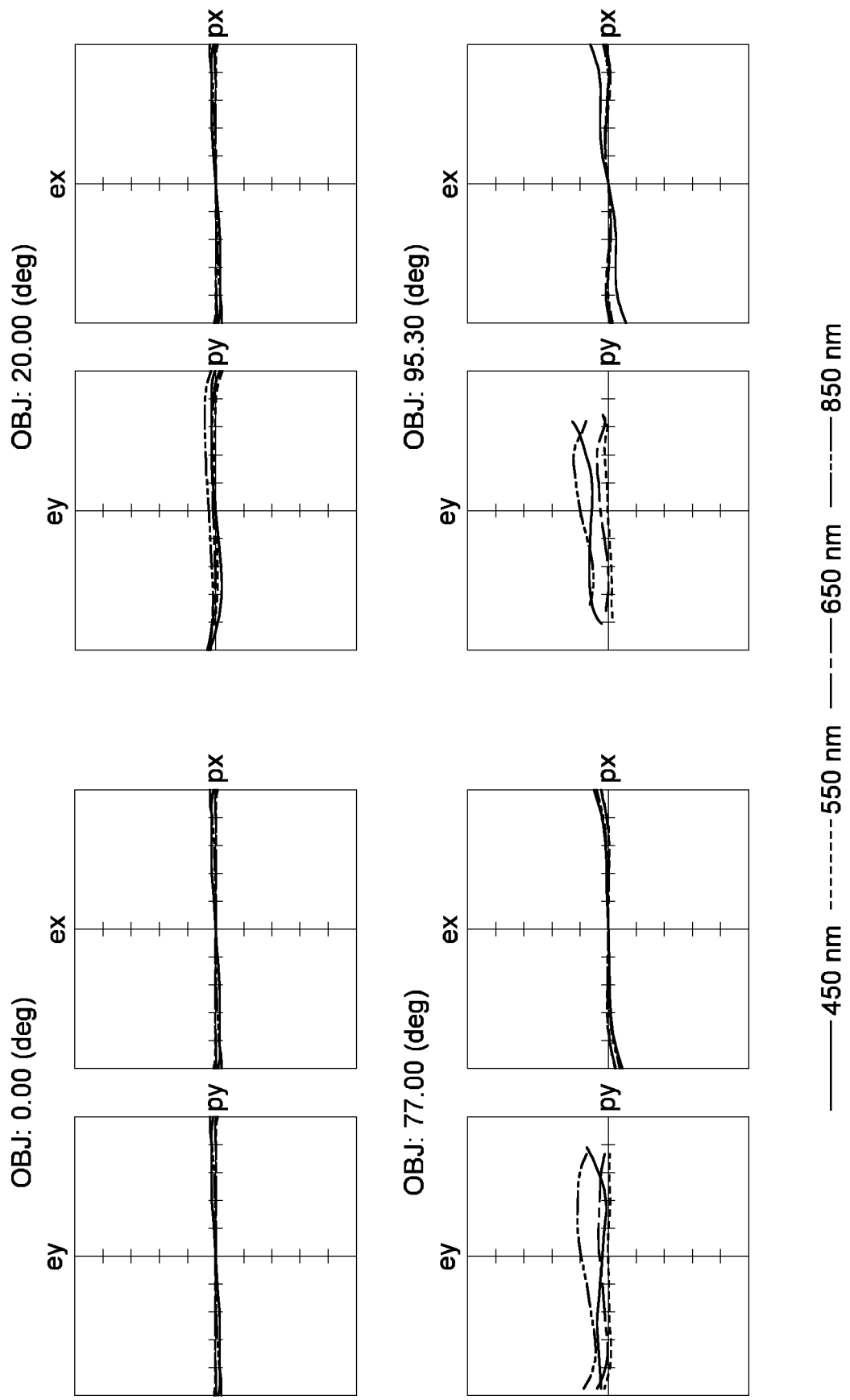

FIG. 2 and FIG. 3 are the optical simulation data of the lens assembly 10a according to the present embodiment. FIG. 2 is a focus shift plot of the lens assembly 10a at different wavelengths. The intersection of the first focal plane with the optical path of the lens assembly 10a is referred as the first intersection, wherein the first focal plane is the focal point at wavelength 555 nm of the lens assembly 10a. The intersection of the second focal plane with the optical path of the lens assembly 10a is referred as a second intersection, wherein the second focal plane is the focal point at wavelength 850 nm of the lens assembly 10a. The distance between the first intersection and the second intersection is the focus shift between the visible and the near infra-red light of the lens assembly 10a. In the present embodiment, the value of the focus shift about the second intersection and the first intersection is 5 μm. It should be noted that the light at 555 nm is a reference for measuring a focal plane rather than other wavelength. FIG. 3 is a ray fan plot, wherein the X-axis denotes the ray position at pupil, and the Y-axis denotes the ray position at the imaging plane (such as the imaging plane 19). Since FIG. 2 and FIG. 3 are within a standard range, it can be concluded that the lens assembly 10a according to the present embodiment really possesses excellent features of optical quality with IR correction.

The lens assembly according to an embodiment of the present invention includes a front lens group and a rear lens group. The front group includes two lenses for collecting light at a wide angle, but the present invention is not limited thereto. The F/# of the lens is greater than or equivalent to 2.0. The lens assembly includes multiple aspheric lenses to achieve the design of lighter weight and shorter total track length. The lens assembly includes 5 to 8 elements with refractive power, and the Abbe numbers of three lenses, at least, are greater than 55.

In an embodiment, the lens surface of the lens assembly satisfies: 0.65<D1/LT<0.98. In another embodiment, the lens surface of the lens assembly satisfies: 0.67<D1/LT<0.98. In an alternate embodiment, the lens surface of the lens assembly satisfies: 0.7<D1/LT<0.98. D1 is the diameter of the lens surface of the first lens group farthest from the second lens group. LT is the length on the optical axis of the lens from the lens surface farthest from the imaging plane of the lens assembly to the lens surface closest to the imaging plane of the lens assembly. A better optical performance can be obtained within a limited space, which allows the light entering the lens assembly converges to the image sensor.

In an embodiment, the lens assembly satisfies: 3.5<LT/IMH<6. In another embodiment, the lens assembly satisfies: 3.6<LT/IMH<5.9. In an alternate embodiment, the lens assembly satisfies: 3.7<LT/IMH<5.8. Thus, a better design is provided with the image circle and the total length of the lens assembly. The image height (IMH) is ½ of the length of the image circle on the imaging plane. LT is the length on the optical axis of the lens from the lens surface farthest from the imaging plane of the lens assembly to the lens surface closest to the imaging plane of the lens assembly.

Figure 4:
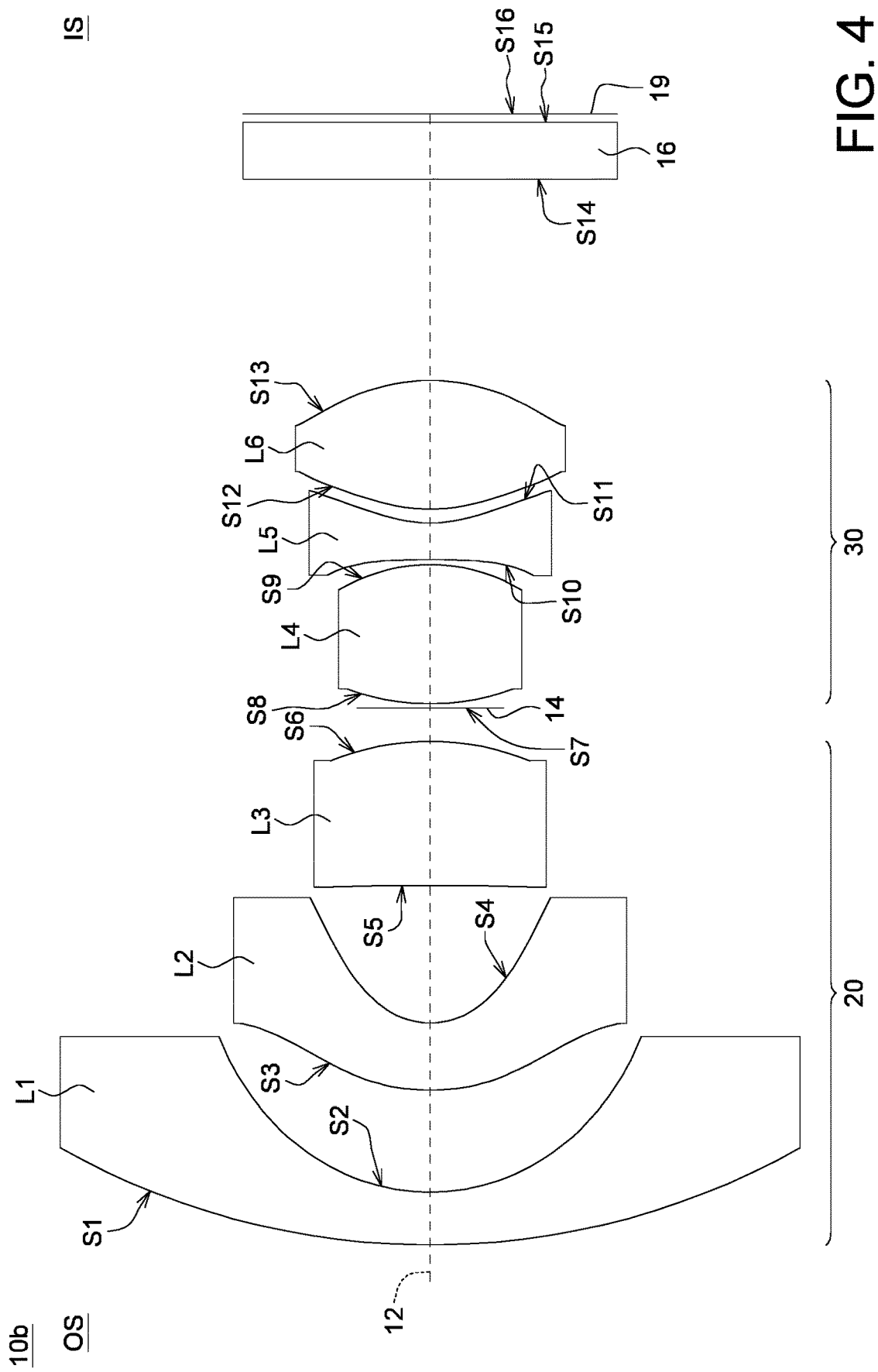
FIG. 4 is a schematic diagram of a lens assembly 10b according to an embodiment of the present invention.

The design of the lens assembly according a second embodiment of the present invention is disclosed below. FIG. 4 is a schematic diagram of a lens assembly 10b according to a second embodiment of the present invention. The lens assembly 10b include a first lens L1, a second lens L2, a third lens L3, an aperture 14, a fourth lens L4, a fifth lens L5 and a sixth lens L6. The first lens L1, the second lens L2 and the third lens L3 together form the first lens group (such as the front group) 20 with a negative refractive power. The fourth lens L4, the fifth lens L5 and the sixth lens L6 together form a second lens group (such as the rear group) 30 with a positive refractive power. In the present embodiment, the refractive powers of the first lens L1 to the sixth lens L6 of the lens assembly 10b, in sequence, are: negative, negative, positive, positive, negative, positive, and the second lens, the third lens, the fifth lens and the sixth lens are aspheric plastic lenses. In an embodiment, aspheric plastic lenses can be replaced by aspheric glass lenses. In the present embodiment, the diameter of surface S1 is 9.04 mm, and the diameter of surface S13 is 3.3 mm. The design parameters of the lens and the peripheral elements of the lens assembly 10b are listed in Table 3.

TABLE 3

F/# = 2.0; TTL = 12.2 (mm); LT = 9.32 (mm)
DFOV = 191°; LT/DL = 2.8; IMH = 2.2 (mm)
D1/DL = 2.74; LT/IMH = 4.24; D1/LT = 0.97

| Surface | Radius of curvature (mm) | Distance (mm) | Refractive power | Abbe number | Element |
|---|---|---|---|---|---|
| S1 | 10.25 | 0.57 | 1.77 | 49.6 | L1 (convex-concave) |
| S2 | 2.83 | 1.10 | | | |
| S3* | 3.11 | 0.72 | 1.55 | 56.1 | L2 (aspheric) |
| S4* | 1.07 | 1.48 | | | |
| S5* | −32.18 | 1.56 | 1.66 | 20.4 | L3 (aspheric) |
| S6* | −3.65 | 0.35 | | | |
| S7 | INF. | 0.05 | | | Aperture 14 |
| S8 | 3.32 | 1.50 | 1.44 | 95 | L4 (bi-convex) |
| S9 | −2.42 | 0.05 | | | |
| S10* | −157.34 | 0.40 | 1.66 | 20.4 | L5 (aspheric) |
| S11* | 1.65 | 0.15 | | | |
| S12* | 2.08 | 1.39 | 1.55 | 56.1 | L6 (aspheric) |
| S13* | −2.60 | 2.22 | | | |
| S14 | INF. | 0.61 | 1.52 | 64.2 | Cover glass 18 |
| S15 | INF. | 0.05 | | | |
| S16 | | | | | Imaging plane 19 |

The aspheric coefficients of the aspheric lens surface according to the second embodiment of the present invention are listed in Table 4.

TABLE 4

| | S3* | S4* | S5* | S6* |
|---|---|---|---|---|
| k | 0.38 | −0.88 | 86.81 | −0.41 |
| A | 3.40E−02 | 1.39E−01 | 8.46E−03 | −5.78E−04 |
| B | −2.21E−02 | −7.56E−02 | −4.78E−03 | −4.99E−04 |
| C | 9.19E−03 | 1.10E−01 | 4.84E−03 | −5.09E−04 |
| D | −4.11E−03 | −1.19E−01 | −2.55E−03 | 1.08E−04 |
| E | 1.17E−03 | 6.59E−02 | 3.19E−04 | — |
| F | −1.92E−04 | −1.94E−02 | — | — |
| G | 1.69E−05 | 2.40E−03 | — | — |

| | S10* | S11* | S12* | S13* |
|---|---|---|---|---|
| k | −98.0 | −1.67 | −2.27 | −1.75 |
| A | −1.24E−01 | −1.99E−01 | −8.77E−02 | −1.95E−03 |
| B | 1.18E−01 | 2.63E−01 | 7.33E−02 | −8.05E−03 |
| C | −1.07E−01 | −2.74E−01 | −4.49E−02 | 6.83E−03 |
| D | 5.06E−02 | 2.02E−01 | 2.11E−02 | −3.93E−03 |
| E | −9.94E−03 | −9.65E−02 | −6.92E−03 | 1.70E−03 |
| F | — | 2.64E−02 | 1.41E−03 | −3.85E−04 |
| G | — | −3.11E−03 | −1.30E−04 | 4.08E−05 |

The distance of the surface S1 is the distance on the optical axis 12 from the surface S1 to the surface S2. The distance of the surface S2 is the distance on the optical axis 12 from the surface S2 to the surface S3. The distance of the surface S15 is the distance on the optical axis 12 from the surface S15 to the imaging plane 19 of a visible light at an effective focal length. The lens assembly includes at least two elements whose Abbe number is greater than 55.

Figure 5:
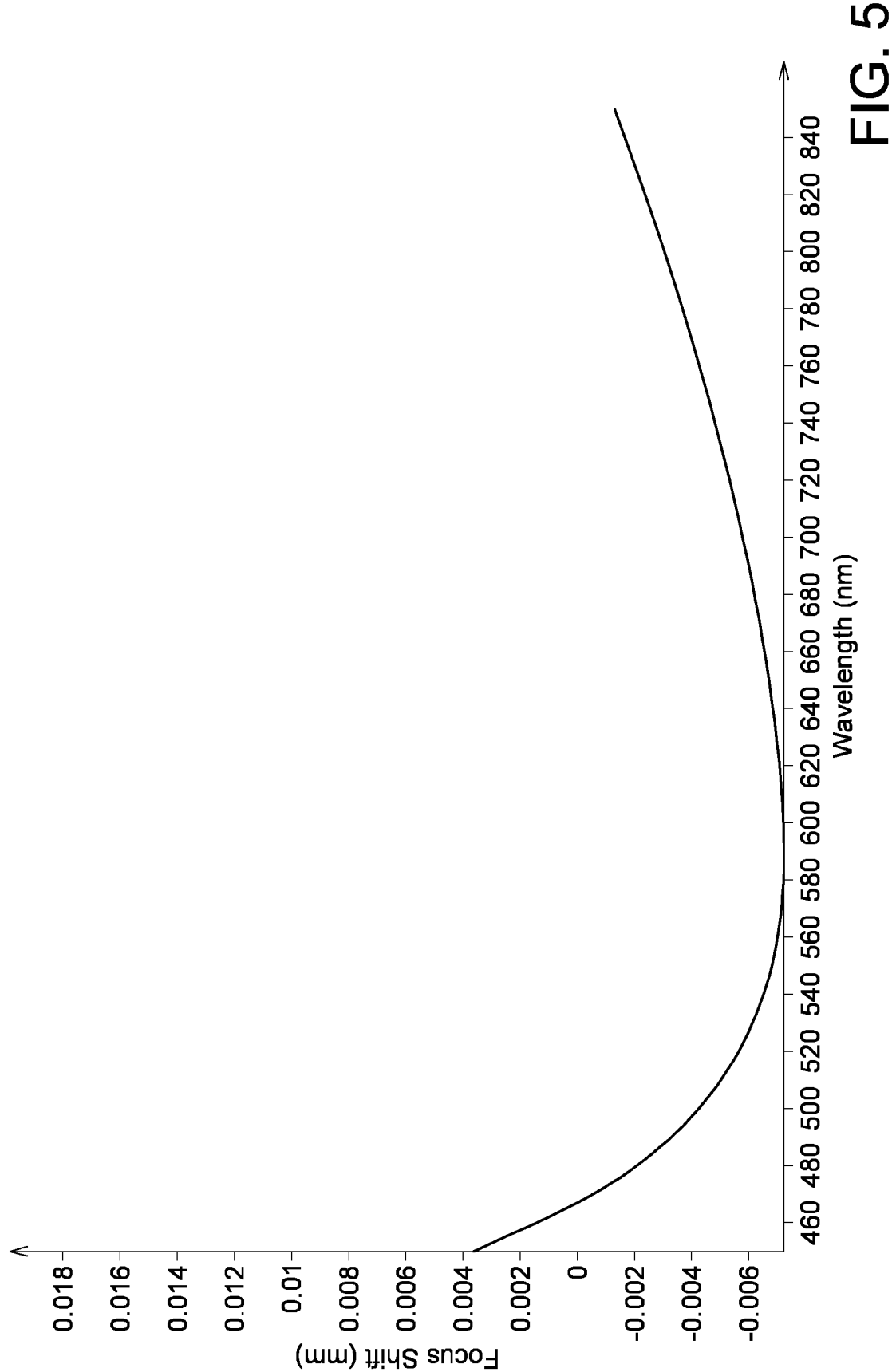
FIG. 5 and FIG. 6, respectively, are a focus shift plot and a ray fan plot of the lens assembly 10b.
Figure 6:
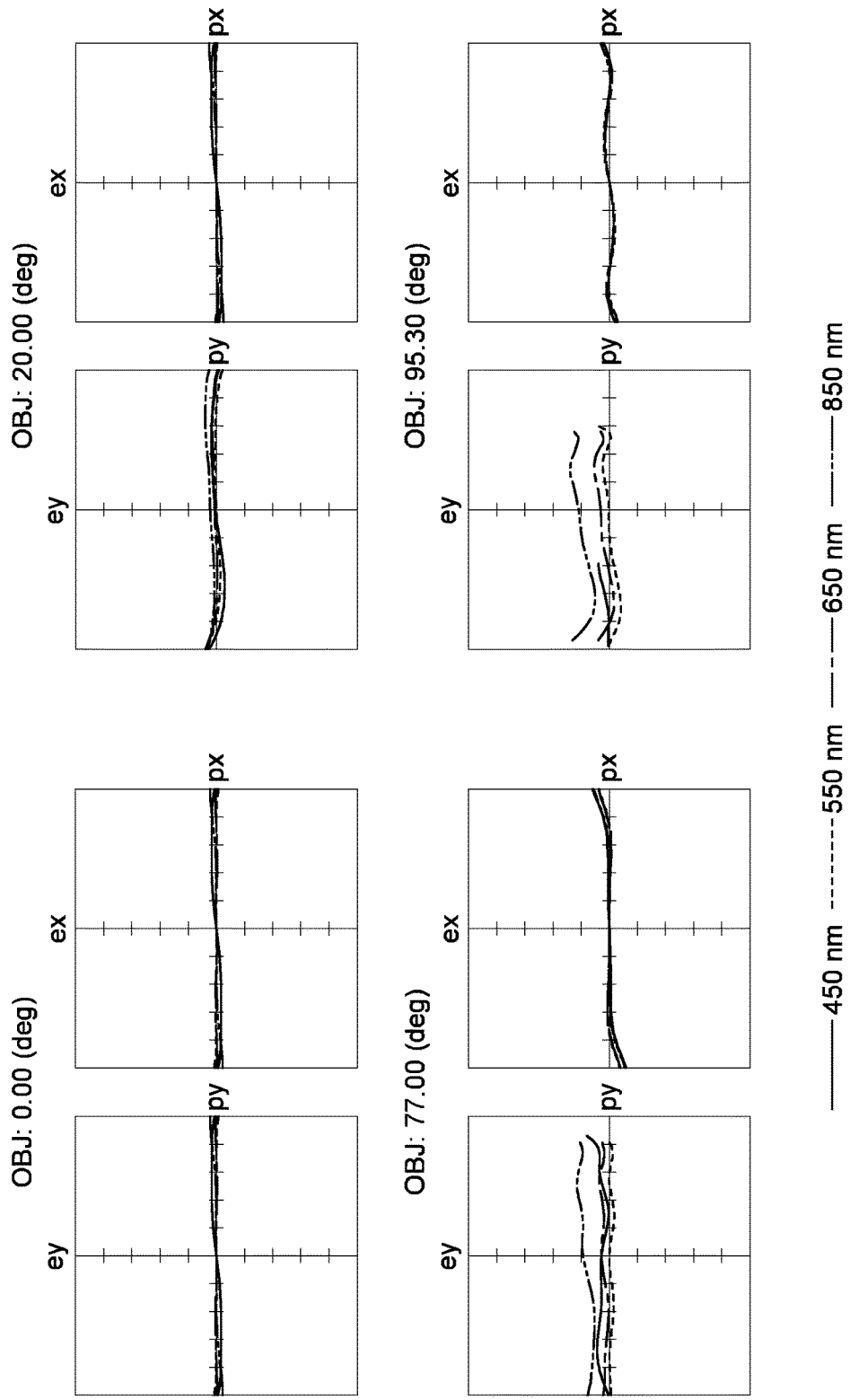

FIG. 5 and FIG. 6 are plotted according to the optical imaging simulation data of the lens assembly 10b according to the present embodiment. FIG. 5 is a focus shift plot of the lens assembly 10b under different wavelengths of the light. In the present embodiment, the second intersection has a shift of about 6 μm with respect to the first intersection. FIG. 6 is a ray fan plot under different wavelengths of a visible light. Since all plots of FIG. 5 and FIG. 6 are within a standard range, it can be concluded that the lens assembly 10b according to the present embodiment really possesses excellent features of optical quality with IR correction.

Figure 7:
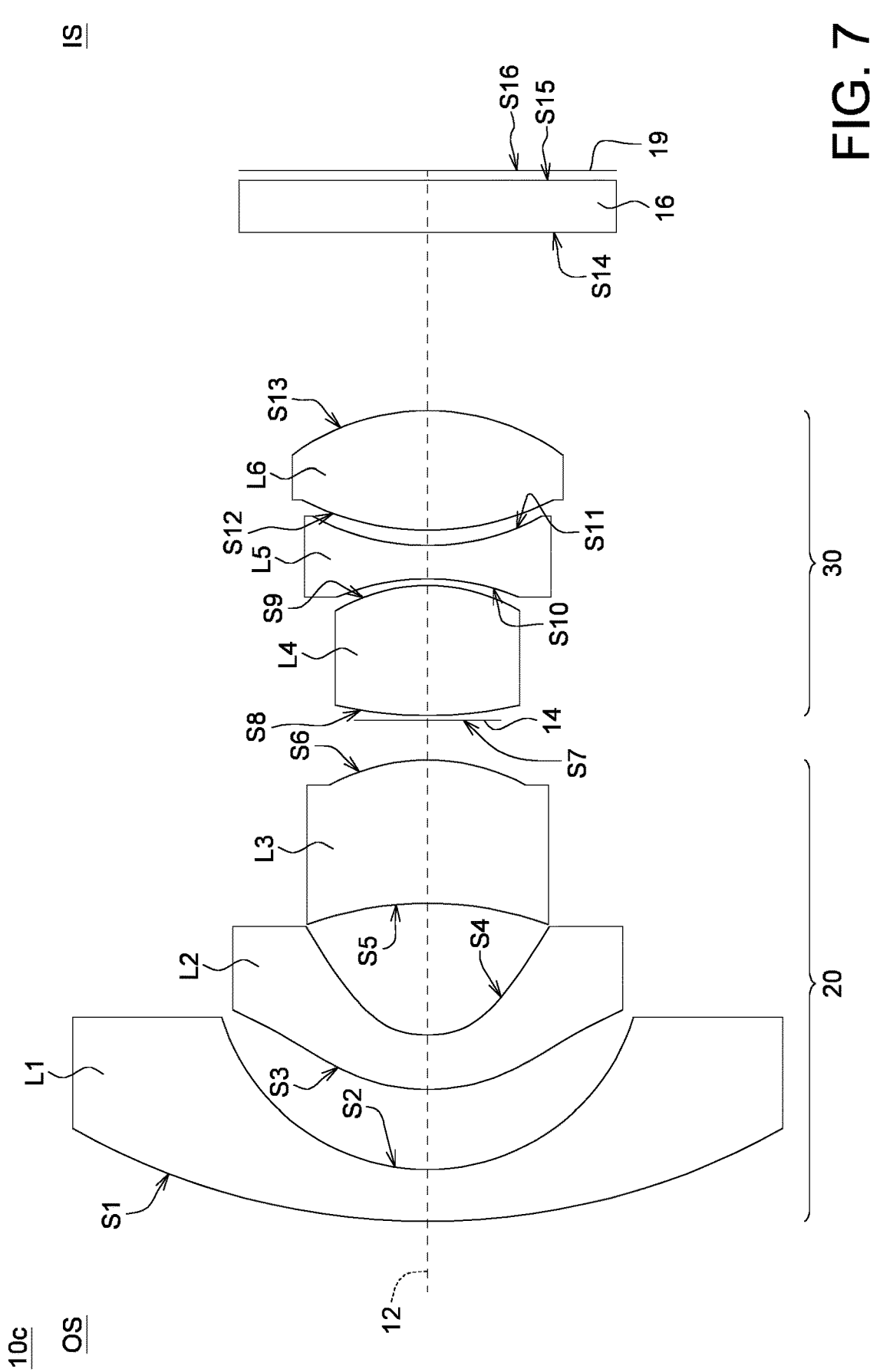
FIG. 7 is a schematic diagram of a lens assembly 10c according to an embodiment of the present invention.

The design of the lens assembly according a third embodiment of the present invention is disclosed below. FIG. 7 is a schematic diagram of a lens assembly 10c according to a third embodiment of the present invention. The lens assembly 10c includes a first lens L1, a second lens L2, a third lens L3, an aperture 14, a fourth lens L4, a fifth lens L5 and a sixth lens L6. The first lens L1, the second lens L2 and the third lens L3 together form a first lens group (such as the front group) 20 with a negative refractive power. The fourth lens L4, the fifth lens L5 and the sixth lens L6 together form a second lens group (such as the rear group) 30 with a positive refractive power. In the present embodiment, the refractive powers of the first lens L1 to the sixth lens L6 of the lens assembly 10c, in sequence, are: negative, negative, positive, positive, negative, positive, and the second, the third, the fifth and the sixth lens are aspheric plastic lenses. In an embodiment, aspheric plastic lenses can be replaced by aspheric glass lenses. In the present embodiment, the diameter of surface S1 is 8.9 mm, and the diameter of surface S13 is 3.36 mm. The design parameters of the lens and the peripheral elements of the lens assembly 10c are listed in Table 5.

TABLE 5

F/# = 2.0; TTL = 12.2 (mm); LT = 9.43 (mm)
DFOV = 191°; LT/DL = 2.8; IMH = 2.2 (mm)
D1/DL = 2.65; LT/IMH = 4.3; L1/LT = 0.94

| Surface | Radius of curvature (mm) | Distance (mm) | Refractive power | Abbe number | Element |
|---|---|---|---|---|---|
| S1 | 9.82 | 0.60 | 1.77 | 49.6 | L1 (convex-concave) |
| S2 | 2.78 | 0.92 | | | |
| S3* | 2.87 | 0.62 | 1.55 | 56.1 | L2 (aspheric) |
| S4* | 1.11 | 1.56 | | | |
| S5* | −6.49 | 1.65 | 1.66 | 20.4 | L3 (aspheric) |
| S6* | −2.73 | 0.45 | | | |
| S7 | INF. | 0.05 | | | Aperture 14 |
| S8 | 3.95 | 1.53 | 1.5 | 81.6 | L4 (bi-convex) |
| S9 | −2.22 | 0.05 | | | |
| S10* | −12.52 | 0.40 | 1.66 | 20.4 | L5 (aspheric) |
| S11* | 1.72 | 0.19 | | | |
| S12* | 2.24 | 1.40 | 1.55 | 56.1 | L6 (aspheric) |
| S13* | −2.78 | 2.11 | | | |
| S14 | INF. | 0.61 | 1.52 | 64.2 | Cover glass 18 |
| S15 | INF. | 0.05 | | | |
| S16 | | | | | Imaging plane 19 |

The aspheric coefficients of the aspheric lens surface according to the third embodiment are listed in Table 6.

TABLE 6

| | S3* | S4* | S5* | S6* |
|---|---|---|---|---|
| k | 0.15 | −0.98 | 14.67 | −0.04 |
| A | 2.60E−02 | 1.20E−01 | −6.36E−03 | −1.44E−03 |
| B | −1.42E−02 | −7.45E−02 | −2.98E−03 | −2.91E−04 |
| C | 3.41E−03 | 1.14E−01 | −1.94E−04 | −6.79E−05 |
| D | −1.13E−03 | −1.19E−01 | −3.68E−04 | 6.73E−04 |
| E | 2.58E−04 | 6.59E−02 | 3.19E−04 | −2.16E−04 |
| F | −2.97E−05 | −1.94E−02 | — | — |
| G | 1.31E−06 | 2.40E−03 | — | — |

| | S10* | S11* | S12* | S13* |

TABLE 6-continued

| | | | | |
|---|---|---|---|---|
| k | −98 | −1.65 | −1.73 | −1.33 |
| A | −1.45E−01 | −1.99E−01 | −9.06E−02 | −1.40E−03 |
| B | 1.75E−01 | 2.62E−01 | 6.77E−02 | −1.05E−02 |
| C | −2.49E−01 | −2.72E−01 | −4.30E−02 | 1.02E−02 |
| D | 2.66E−01 | 2.01E−01 | 2.09E−02 | −6.91E−03 |
| E | −1.91E−01 | −9.65E−02 | −6.92E−03 | 2.90E−03 |
| F | 7.93E−02 | 2.64E−02 | 1.41E−03 | −6.68E−04 |
| G | −1.42E−02 | −3.11E−03 | −1.30E−04 | 6.92E−05 |

The distance of the surface S1 is the distance on the optical axis 12 from the surface S1 to the surface S2. The distance of the surface S2 is the distance on the optical axis 12 from the surface S2 to the surface S3. The distance of the surface S15 is the distance on the optical axis 12 from the surface S15 to the imaging plane 19 of a visible light at an effective focal length. The lens assembly includes at least three elements whose Abbe number is greater than 50.

Figure 8:
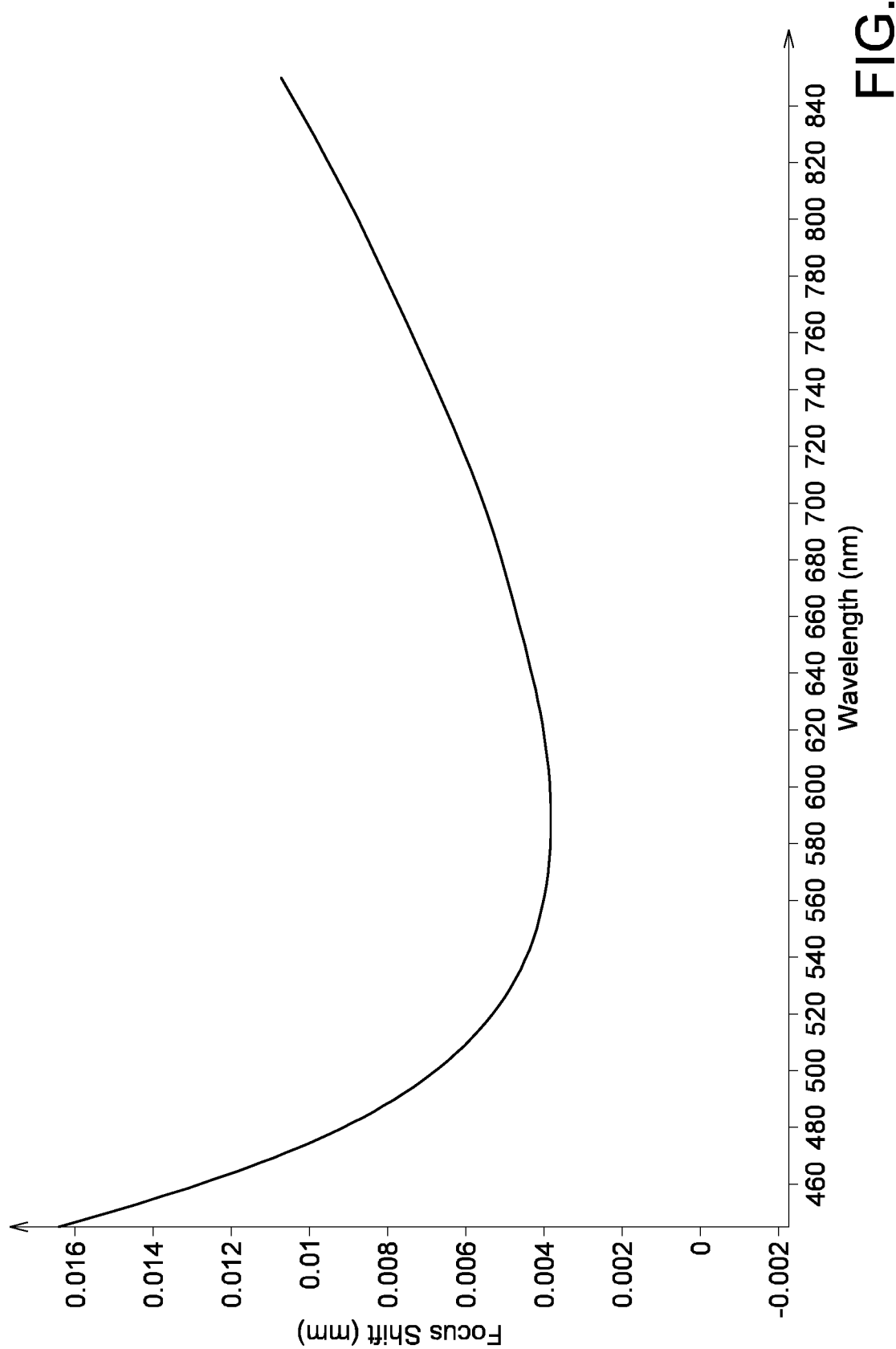
FIG. 8 and FIG. 9, respectively, are a focus shift plot and a ray fan plot of the lens assembly 10c.
Figure 9:
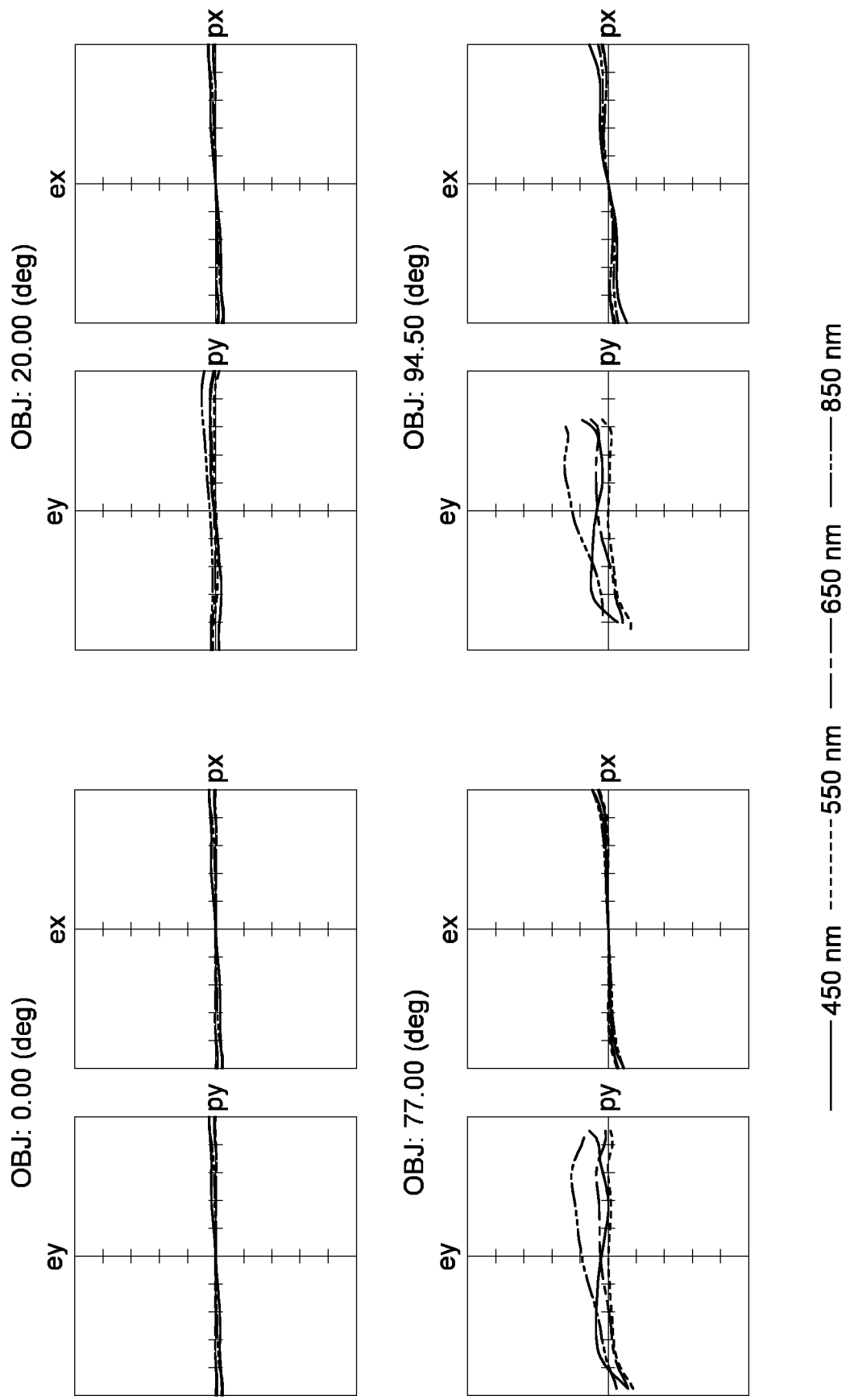

FIG. 8 and FIG. 9 are plotted according to the optical imaging simulation data of the lens assembly 10c according to the present embodiment. FIG. 8 is a focus shift plot of the lens assembly 10c under different wavelengths of the light. In the present embodiment, the second intersection has a shift of about 7 μm with respect to the first intersection. FIG. 9 is a ray fan plot under different wavelengths of a visible light. Since all plots of FIG. 8 and FIG. 9 are within a standard range, it can be concluded that the lens assembly 10c according to the present embodiment really possesses excellent features of optical quality with IR correction.

Through the design disclosed in the embodiments of the present invention, an image lens having the features of excellent optical quality with low cost and IR correction is provided. Based on that design that the lens assembly includes 5 to 8 elements and that the total track length (TTL) of the lens assembly is less than 15 mm, the lens assembly advantageously possesses the features of larger aperture, higher resolution, lighter weight, shorter total track length and IR correction (the shifted value can be less than 20 μm), and the manufacturing cost can be reduced.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, comprising:
   a first lens group, comprising at least two lenses with refractive power;
   a second lens group with a positive refractive power, comprising at least two lenses with refractive power; and
   an aperture disposed between the first lens group and the second lens group, wherein the number of the lenses with refractive power is larger than 4 but less than 9; D1 is the diameter of the lens surface of the first lens group farthest from the second lens group; LT is the length on the optical axis of the lens from the lens surface farthest from an imaging plane of the lens assembly to the lens surface closest to the imaging plane of the lens assembly; IMH is ½ of the length of the image circle on the imaging plane; the lens assembly satisfies the following conditions:
   $3.5 < LT/IMH < 6$, and $0.65 < D1/LT < 0.98$.

2. The lens assembly according to claim 1, wherein an aperture value (F/#) of the lens assembly is greater than or equivalent to 2.0.

3. The lens assembly according to claim 1, wherein total track length (TTL) being the length on the optical axis of the lens from the lens surface farthest from the imaging plane of the lens assembly to the imaging plane of the lens assembly is less than 15 mm.

4. The lens assembly according to claim 1, wherein the lens assembly comprises at least 3 lenses having an Abbe number greater than 55.

5. The lens assembly according to claim 1, wherein the lens assembly comprises at least 2 plastic lenses having an Abbe number greater than 55.

6. The lens assembly according to claim 1, wherein the lens assembly comprises at least 3 lenses having an Abbe number greater than 50.

7. The lens assembly according to claim 1, wherein the lens of the lens assembly farthest from the imaging plane is formed of glass.

8. The lens assembly according to claim 1, wherein the total length (LT) of the lens assembly is less than 11 mm.

9. The lens assembly according to claim 1, wherein the lenses of the lens assembly in order from the image magnification side to the image reduction side are: convex-concave lens, aspheric lens, aspheric lens, bi-convex lens, aspheric lens, and aspheric lens.

10. The lens assembly according to claim 1, wherein the refractive powers of the lenses of the lens assembly in order from the image magnification side to the image reduction side are: negative, negative, positive, positive, negative, positive.

11. A lens assembly, comprising in order from the image magnification side to the image reduction side:
   a first lens, a second lens, a third lens, a fourth lens and a fifth lens in the lens assembly, wherein the second lens to the fifth lens are aspheric lenses;
   the lens assembly includes less than 9 lenses with refractive power,
   the field of view (FOV) is between 180° and 220°; LT is the length on the optical axis of the lens from the lens surface farthest from an imaging plane of the lens assembly to the lens surface closest to the imaging plane of the lens assembly; IMH is ½ of the length of the image circle on the imaging plane; the lens assembly satisfies the condition of $3.5 < LT/IMH < 6$;
   an intersection of a first focal plane with an optical path of the lens assembly is referred as a first intersection, and the first focal plane is the focal point at wavelength of 555 nm of the lens assembly; an intersection of a second focal plane with an optical path of the lens assembly is referred as a second intersection, and the second focal plane is the focal point at wavelength of 850 nm of the lens assembly; a distance from the second intersection to the first intersection is less than 20 μm.

12. The lens assembly according to claim 11, wherein an aperture value (F/#) of the lens assembly is greater than or equivalent to 2.0.

13. The lens assembly according to claim 11, wherein total track length (TTL) being the length on the optical axis of the lens from the lens surface farthest from an imaging plane of the lens assembly to the imaging plane of the lens assembly is less than 15 mm.

14. The lens assembly according to claim 11, wherein the lens assembly comprises at least 3 lenses having an Abbe number greater than 55.

15. The lens assembly according to claim 11, wherein the lens assembly comprises at least 2 plastic lenses having an Abbe number greater than 55.

16. The lens assembly according to claim 11, wherein the lens assembly comprises at least 3 lenses having an Abbe number greater than 50.

17. The lens assembly according to claim 11, wherein the lens of the lens assembly farthest from an imaging plane is formed of glass.

18. The lens assembly according to claim 11, wherein the total length (LT) of the lens assembly is less than 11 mm.

19. The lens assembly according to claim 11, wherein the lenses of the lens assembly in order from the image magnification side to the image reduction side are: convex-concave lens, aspheric lens, aspheric lens, bi-convex lens, aspheric lens, and aspheric lens.

20. The lens assembly according to claim 11, wherein the refractive powers of the lenses of the lens assembly in order from the image magnification side to the image reduction side are: negative, negative, positive, positive, negative, positive.

* * * * *